UNITED STATES PATENT OFFICE.

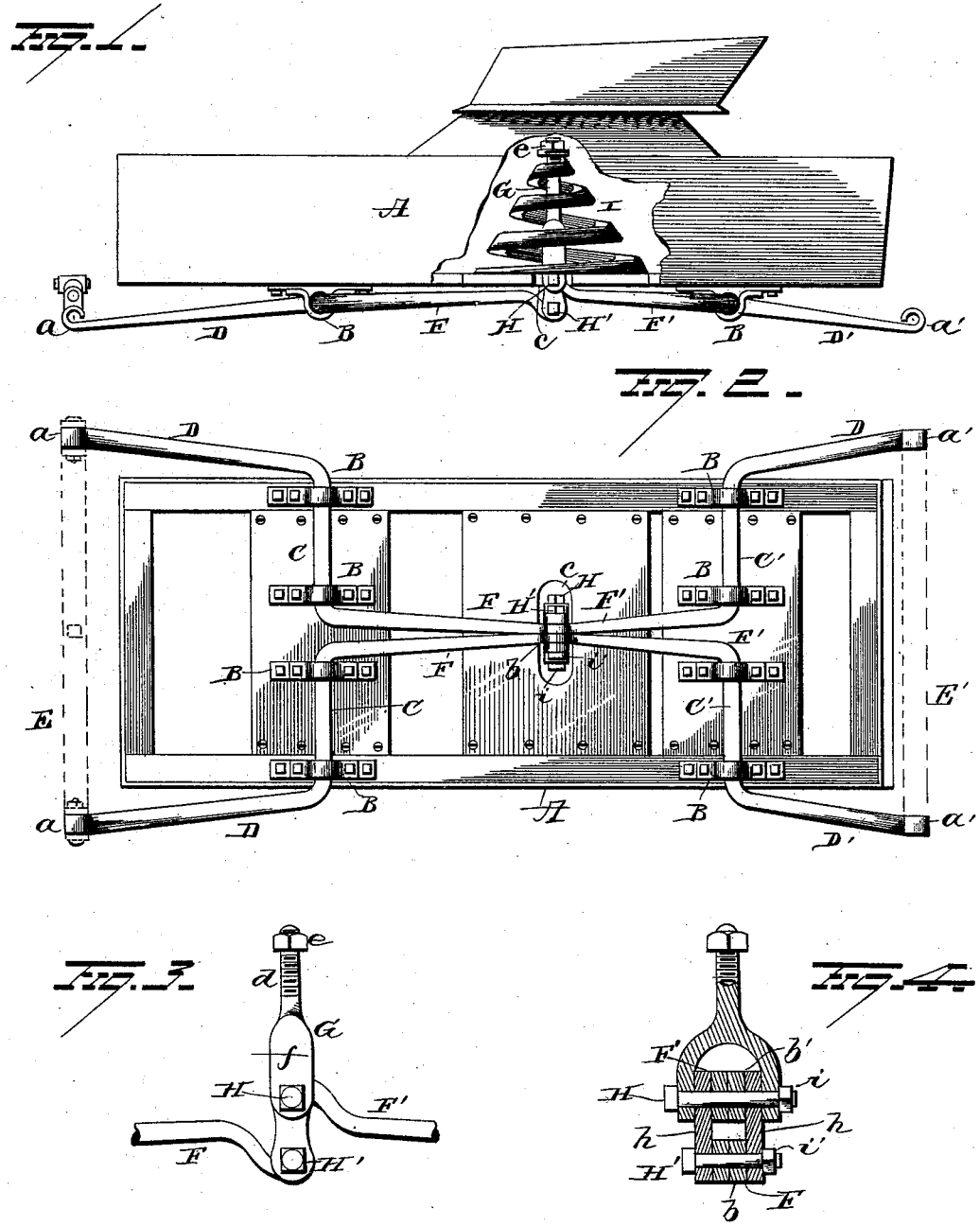

HENRY C. SWAN, OF OSHKOSH, WISCONSIN.

VEHICLE-SPRING.

SPECIFICATION forming part of Letters Patent No. 393,795, dated December 4, 1888.

Application filed September 18, 1888. Serial No. 285,731. (No model.)

*To all whom it may concern:*

Be it known that I, HENRY C. SWAN, of Oshkosh, in the county of Winnebago and State of Wisconsin, have invented certain new and useful Improvements in Vehicle-Springs; and I do hereby declare the following to be a full, clear, and exact description of the invention, such as will enable others skilled in the art to which it appertains to make and use the same.

My invention relates to an improvement in vehicle-springs, and more particularly to such in which spiral springs are employed.

Heretofore spiral springs have been centrally located within a vehicle-body and connected to inwardly-extending arms of rock-shafts, which latter were journaled in suitable brackets secured to the bottom of the vehicle. With such prior constructions the inwardly-extending arms of the rock-shafts were connected to the spiral spring (through the medium of a connecting-rod) by means of shackles, said shackles being located side by side in a horizontal plane, and therefore two sets of shackles were necessary. Such construction and arrangement are objectionable in view of the fact that the weight of the vehicle and its occupants is thrown upon one rock-shaft and would have a tendency to strain the adjusting-bolt sidewise and produce an unnatural and undesired movement of all the parts.

It is the object of my present invention to obviate this objection of prior constructions, and to so construct and arrange the parts that the pressure and strain will be brought in line with the vertical axis of the spiral spring.

A further object is to provide a spiral spring for vehicles which shall require a small number of parts in its connection with the vehicle.

A further object is to provide a spiral spring for vehicles with an adjusting-bolt, and to so connect the rock-shafts to said bolt that the weight of the vehicle will be in line with the vertical axis of the spring.

A further object is to produce a spiral spring for vehicles which shall be simple and cheap in construction and effective in operation.

With these objects in view my invention consists in certain novel features of construction and peculiar combinations and arrangements of parts, as will be hereinafter set forth, and pointed out in the claims.

In the accompanying drawings, Figure 1 is a side view of a vehicle, partly broken away, showing my improved device. Fig. 2 is a bottom plan view of a vehicle having my improvements applied thereto. Fig. 3 is a view of the center connecting-bolt and shackle. Fig. 4 is a view in vertical section of the parts shown in Fig. 3.

A indicates a vehicle-body provided on its bottom near each end with downwardly-projecting brackets B, having perforations for the reception of rock-shafts C C', journaled in said brackets. The forward rock-shaft, C, is provided at each end with integral forwardly-extending arms or levers D, which project slightly outwardly and beyond the forward end of the vehicle, and are provided at their free extremities with eyes $a$, by which said arms may be connected to the front springs, E, in the usual manner. The rear rock-shafts, C', are also provided with rearwardly-extending arms D', which project slightly outwardly from the vehicle-body and beyond the rear end of the vehicle, where they are furnished with eyes $a'$, by which to attach them to the rear spring, E'.

The rock-shafts C C' are furnished at their inner ends with inwardly-extending arms or levers F F', which meet at the center of the vehicle-body, as shown in Fig. 2, the arms F at this point being preferably bent slightly downwardly and provided with eyes $b$, and the arms F' bent slightly upwardly and furnished with eyes $b'$.

At the center of the bottom of the vehicle-body, where the arms F F' meet, an elongated perforation, $c$, is made for the reception of the lower end of the bolt G. The bolt or connecting-bar G is made as most clearly shown in Figs. 3 and 4, having a straight upper screw-threaded portion, $d$, provided with a nut, $e$, and a lower bifurcated or yoked portion, $f$, which latter portion projects into the perforation $c$ in the bottom of the vehicle. Inserted between the arms of the yoke $f$ of bolt G are two links, $h$, and between these links $h$ the inner ends of the arms F of the rock-shafts C' are inserted. The arms of the yoke $f$ and the links $h$ are provided with perforations to align with the eyes $b'$ of the arms F', and a bolt, H, is passed through said perforations to pivotally connect them together, said bolt being headed at one end and provided at the other end with screw-threads for the reception of a suitable nut, $i$. The lower ends of the links $h$, which project below the extremities of the yoke $f$, are also provided with aligned perforations. The ends of the arms F are inserted between the lower ends of the links, and the eyes $b$ of the inner ends of said arms are made to align with the perforations near the lower ends of the links $h$. A bolt, H', is now passed through the perforations in the links $h$ and eyes $b$ of the arms F, and thus pivotally connect them together, said bolt being headed at one end and provided at its other end with screw-threads for the reception of a suitable nut, $i'$. Thus it will be seen that the inner ends of the arms F F' of the rock-shafts C C' are pivotally connected to the bolt G—one set of arms above the other and in line with the vertical axis of said bolt.

A spiral spring, I, made of material of sufficient size to insure the proper strength, is placed within the vehicle immediately over the perforation $c$ in its bottom. The bolt G, which projects upwardly into the vehicle, extends centrally through the spring I, the upper end of which is adapted to bear against nut $e$ on the upper portion, $d$, of the bolt. It is evident that the nut $e$ may be screwed more or less upon the bolt G, to regulate the tension of the spring I.

By the combination and arrangement of the device above described but few parts are employed and not likely to get out of order, and the weight of the vehicle and its occupants is brought in line with the vertical axis of the spring, thereby causing the weight to come equally on the rock-shafts at both ends of the vehicle.

Having fully described my invention, what I claim as new, and desire to secure by Letters Patent, is—

1. The combination, with a vehicle-body having a central perforation in its bottom, of a spiral spring mounted in the body over the opening, a bolt connected to said spring and provided at its lower end with a yoke, links pivoted in said yoke, rock-shafts journaled on the vehicle, and arms extending inwardly from the rock-shafts and pivoted between and to said links in line with the vertical axis of the spring, substantially as set forth.

2. The combination, with a vehicle-body, of a spiral spring mounted therein, a bolt suspended from said spring and provided with a yoke at its lower ends, rock-shafts journaled on the bottom of the vehicle, arms extending inwardly from said rock-shafts and provided with eyes at their inner extremities, links pivoted between the arms of the yoke, between which latter the inner ends of the arms of the rock-shafts are inserted, one pair of arms above the other, in line with the vertical axis of the spring, a bolt pivotally connecting the links and one pair of arms to the yoke, and another bolt pivotally connecting the other pair of arms to the links, substantially as set forth.

In testimony whereof I have signed this specification in the presence of two subscribing witnesses.

HENRY C. SWAN.

Witnesses:
C. R. NEVITT, Jr.,
WALTER S. DROPPERS.